United States Patent Office

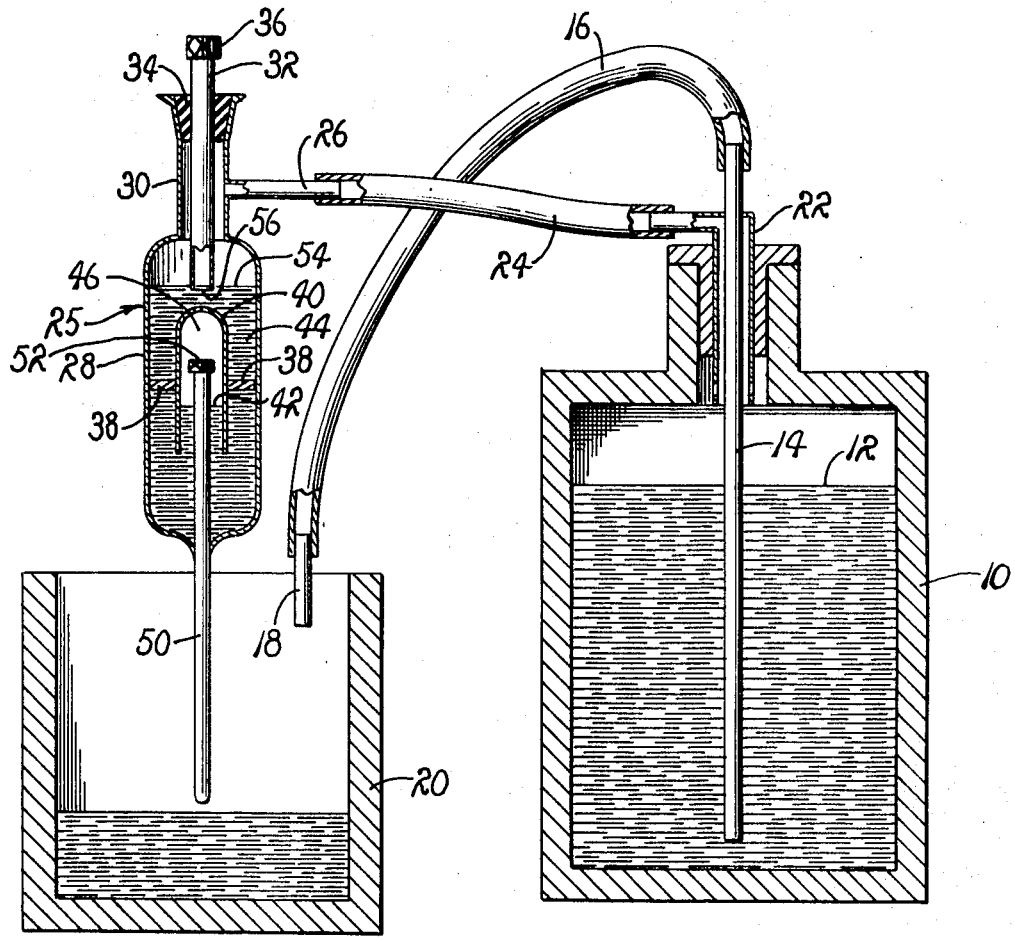

3,605,424
Patented Sept. 20, 1971

3,605,424
VALVING DEVICE FOR AUTOMATIC REFILLING IN CRYOGENIC LIQUID SYSTEMS
Thomas O. Paine, Administrator of the National Aeronautics and Space Administration, with respect to an invention of Joe Liberotti, La Crescenta, Calif.
Filed Mar. 19, 1970, Ser. No. 20,960
Int. Cl. F17c 7/02
U.S. Cl. 62—51
8 Claims

ABSTRACT OF THE DISCLOSURE

A mercury column, the level of which is varied by expansion and contraction of methane within a mercury-submerged bell and communicating fluid-level probe, is employed to valve the vent of a closed cryogenic liquid supply vessel and cause cryogenic liquid to be displaced therefrom into a cryogenic liquid consumption device.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

(1) Field of the invention

The present invention relates to a novel valving device especially adapted for use in a refilling system for cryogenic liquids wherein the vent of a closed supply vessel is valved to cause liquid to be displaced therefrom into a liquid consumption device when the valve is closed; the valve being opened and closed in response to changes in the level of the cryogenic liquid in the liquid consumption receptacle.

(2) Description of the prior art

Systems of the general kind for which the valve of the present invention is designed are known, and various types of valving devices for them, such as that disclosed in the U.S. patent of Klipping et al., No. 3,307,367, have been devised. Experience with previously available devices, however, has not shown them to have the extreme reliability in unattended operation which is desirable in systems of this kind.

OBJECTS AND SUMMARY OF THE INVENTION

In order to achieve the extreme reliability required in systems of the character described, the present invention contemplates the elimination of all mechanical valving elements such as expansible bellows, valve seats, and the like, and the performance of the valving function by raising and lowering the surface of a column of a liquid, such as mercury, into and out of submerging relationship with the end of a vent tube extending from a position closely adjacent the surface of the liquid column to the exterior of the valving device.

Raising and lowering of the level of the surface of the liquid column is effected by increasing and decreasing the volume of a gas contained within a bell, the open end of which is submerged in the liquid.

Expansion and contraction of the gas within the bell is effected in response to changes in the liquid level of a cryogenic liquid contained in a liquid consumption receptacle, such as a cold trap, by means of a hollow probe open at its upper end which is in communication with the interior of the bell and closed at its lower end which is disposed at the level at which it is desired to maintain the cryogenic fluid in the liquid consumption receptacle.

The gas employed within the bell and probe is preferably one liquefying at a temperature above the temperature at which the cryogenic liquid to be supplied by the system boils, so that when the end of the probe is submerged in the cryogenic liquid in the liquid consumption device, at least a portion of the gas within the probe will be liquefied, and a greater change in the volume of gas within the bell will occur than in the case of a mere contraction in the volume of gas within the bell and probe.

BRIEF DESCRIPTION OF THE DRAWING

The single figure of the drawing illustrates a cryogenic fluid refilling system which includes a valving device embodying the present invention.

DESCRIPTION OF THE PREFERRED EMBODIMENT

As shown in the drawing, a supply vessel 10, which may be a Dewar flask containing a cryogenic liquid, such as liquid nitrogen, up to a level such as that indicated at 12, is provided with a liquid outlet conduit 14 which extends from substantially below the liquid level 12 and preferably to a point closely adjacent the bottom of the vessel 10, to the exterior of the vessel 10 where it connects with a liquid transfer line 16 discharging via tube 18 into a receptacle 20. The receptacle 20 may be a second Dewar flask, forming a part of a liquid consumption device, such as a cold trap, for a vacuum pump system.

The supply vessel 10 is vented solely through a vent tube 22 communicating with the interior of the vessel 10 above the level 12 of the cryogenic liquid therein. The vent tube 22 communicates with a vent line 24 which in turn communicates with the valving device of the present invention, generally designated 25, via an inlet 26 of said device.

A system is thus provided in which, when the valving device 25 is open, gas evolved within the vessel 10 by evaporation of the cryogenic liquid therein, is freely vented through vent tube 22, line 24 and valving device 25. When, however, the valving device 25 is closed, pressure builds up within the vessel 10, forcing the cryogenic liquid therein through the outlet tube 14 and tubes 16 and 18 into the receptacle 20.

The valving device of the present invention comprises a hollow cylindrical member 28 having an upper portion 30 of reduced diameter into which the inlet 26 opens and within which is disposed a vent tube 32 secured within the portion 30 by means such as a seal 34. Preferably it is provided with a filter 36 at its exterior end.

Positioned within the member 28, by means such as bridges 38 serving to space it from the inner wall of the member 28 while permitting free communication between the upper and lower portions of the interior of the member 28, is a bell 40, and submerging the open lower end of said bell and partially filling it, as, for instance, up to a level 42, is a body of liquid 44 which is preferably a metal such as mercury which is liquid at normal room temperatures. The interior 46 of the bell 40 above the level 42 of the liquid 44 therein is filled with a medium which is in the gaseous phase at normal room temperatures. It is preferable, however, to employ a condensable medium liquefying at a temperature above the temperature at which the cryogenic liquid to be supplied by the system boils, for reasons which will be apparent hereinafter. In a system handling liquid nitrogen which boils at −195° C., methane boiling at −164° C. is satisfactory for this purpose.

Sealed within the lower end of the member 28 is a hollow probe 50, the open upper end of which extends into the bell 40 and opens into the portion 46 thereof containing the gaseous medium. Preferably the upper end of the probe 50 is provided with a filter 52 which is pervious to the gaseous medium, but not to the liquid 44. The lower end of the probe 50 is closed and extends sufficiently beyond the lower end of the member 28 so that it may be positioned, as shown, at the level at which it is desired to maintain cryogenic fluid in the recpetacle 20.

The level 54 of the liquid 44 within the body member 28 is so related to the open lower end 56 of the vent tube 32 as to make possible submergence of the open lower end 56 in the liquid 44 or, alternatively, lowering of the level 54 sufficiently to disclose the open lower end 56, by relatively small changes in the volume of the gaseous medium 46 within the bell 40. For this purpose, the vent tube 32 is vertically adjustable by sliding within the seal 34.

It will be apparent that when the open lower end 56 of the vent tube 32 is above the level 54 of the liquid 44 in the body member 28, gas evolved from the cryogenic liquid in the supply vessel 10 may be freely vented to atmopshere through tube 22, line 24, inlet 26 and vent tube 32. On the other hand, when the open lower end 56 of the vent tube 32 is submerged below the surface 54 of the liquid 44, such venting cannot take place and the build-up of pressure above the liquid level 12 in the supply vessel 10 will cause the cryogenic liquid therein to be discharged through the tube 14, line 16, and tube 18 into the receptacle 20; such discharge continuing until the hollow lower end of the probe 50 is submerged below the surface of the cryogenic liquid in the receptacle 20.

When such submergence takes place, the volume of gas within the upper end 46 of the bell 40 and within the probe 50 will be decreased or a portion of such gas will be condensed to the liquid phase by the chilling of the lower end of the probe 50, thus causing the level 42 of the liquid 44 to rise within the bell 40 and the level 54 of the liquid 44 within the member 28 to fall, disclosing the open lower end 56 of the vent tube 32 and permitting the resumption of venting of gas from within the supply vessel 10.

Although the invention has been herein shown and described in what is conceived to be the most practical and preferred embodiment, it is recognized that departures may be made therefrom within the scope of the invention.

What is claimed is:

1. A valving device for use in a cryogenic liquid system including a supply vessel having a gas venting conduit, a receptacle, and a liquid conduit for conveying a cryogenic liquid from said supply vessel to said receptacle, comprising a hollow member having an inlet adapted for connection to said gas venting conduit, a vent in said member positioned to permit escape of gas introduced into said member through said inlet, a body of liquid partially filling said member, a partially gas-filled bell having an open end submerged in said body of liquid, and a gas-filled tube in communication with the gas-filled portion of the interior of said bell extending to the exterior of said member; the surface of said body of liquid being so positioned with respect to said vent as to close the same in response to expansion of the gas within said tube and reopen the same in response to contraction thereof.

2. A valving device according to claim 1 in which said vent is in the form of a tube the inner end of which is adjustable to vary its spacing from the surface of said body of liquid.

3. A valving device according to claim 1 in which said body of liquid is mercury.

4. A valving device according to claim 1 in which the gas filling said bell and tube is one liquefying at a temperature above the temperature at which the cryogenic liquid to be supplied by said system boils.

5. A valving device according to claim 2 in which said body of liquid is mercury.

6. A valving device according to claim 2 in which the gas filling said bell and tube is one liquefying at a temperature above the temperature at which the cryogenic liquid to be supplied by said system boils.

7. A valving device according to claim 3 in which the gas filling said bell and tube is one liquefying at a temperature above the temperature at which the cryogenic liquid to be supplied by said system boils.

8. A valving device according to claim 5 in which the gas filling said bell and tube is one liquefying at a temperature above the temperature at which the cryogenic liquid to be supplied by said system boils.

References Cited

UNITED STATES PATENTS 3,307,367   3/1967   Klipping et al. _____ 62—51

MEYER PERLIN, Primary Examiner

R. C. CAPOSSELA, Assistant Examiner

U.S. Cl. X.R.

62—55; 137—87, 386